(12) United States Patent
Bertrand et al.

(10) Patent No.: US 11,511,665 B2
(45) Date of Patent: Nov. 29, 2022

(54) VEHICLE STEERING WHEEL COMPRISING A HORN CONTROL DEVICE, VEHICLE WITH SUCH A STEERING WHEEL, METHOD FOR ASSEMBLING SUCH A STEERING WHEEL

(71) Applicant: Autoliv Development AB, Vargarda (SE)

(72) Inventors: Olivier Bertrand, Courcome (FR); Hugues Doursoux, Latillé (FR); Thomas Letierce, Vouneuil s/Biard (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/275,041

(22) PCT Filed: Sep. 11, 2019

(86) PCT No.: PCT/EP2019/074170
§ 371 (c)(1),
(2) Date: Mar. 10, 2021

(87) PCT Pub. No.: WO2020/053248
PCT Pub. Date: Mar. 19, 2020

(65) Prior Publication Data
US 2022/0055534 A1 Feb. 24, 2022

(30) Foreign Application Priority Data
Sep. 13, 2018 (FR) ...................................... 1858203

(51) Int. Cl.
*B60Q 5/00* (2006.01)
*B62D 1/04* (2006.01)

(52) U.S. Cl.
CPC ............. *B60Q 5/003* (2013.01); *B62D 1/046* (2013.01)

(58) Field of Classification Search
CPC .......... B62D 1/10; B60R 21/203; B60Q 5/003
See application file for complete search history.

(56) References Cited

U.S. PATENT DOCUMENTS

| 7,173,202 B2 | 2/2007 | Tsujimoto et al. |
| 8,556,292 B2 | 10/2013 | Umemura et al. |

(Continued)

FOREIGN PATENT DOCUMENTS

| EP | 1669255 A1 | 6/2006 |
| JP | 2015231841 A | 12/2015 |

(Continued)

*Primary Examiner* — Richard W Ridley
*Assistant Examiner* — Brian J McGovern
(74) *Attorney, Agent, or Firm* — Dickinson Wright PLLC

(57) ABSTRACT

The steering wheel in a vehicle includes a frame, an attachment support movable between a rest position and a depressed position, and an element for guiding the attachment support. The element for guiding the attachment support includes a first guiding part and a second guiding part. Further, the steering wheel includes an electrical circuit part with at least one switch having a first contact terminal, a second contact terminal, a resilient return element, and deformable damping element. In addition, the second guiding part includes a push interface for receiving the return force of the resilient return element. The push interface is arranged between the resilient return element and the damping element, and the second contact terminal is supported by the second guiding part.

16 Claims, 2 Drawing Sheets

(56) References Cited

U.S. PATENT DOCUMENTS

| | | |
|---|---|---|
| 8,794,662 B2 | 8/2014 | Ishii et al. |
| 9,550,525 B2* | 1/2017 | Ishii .................. B60Q 5/003 |
| 10,023,221 B2 | 7/2018 | Obayashi et al. |
| 2006/0131850 A1* | 6/2006 | Tsujimoto ........... B60R 21/2037 |
| | | 200/61.54 |
| 2009/0218739 A1* | 9/2009 | Terada ............... B60R 21/2037 |
| | | 267/136 |
| 2011/0120258 A1* | 5/2011 | Kondo ................. B60Q 5/003 |
| | | 74/552 |
| 2013/0076011 A1* | 3/2013 | Umemura ............. B60Q 5/003 |
| | | 280/728.2 |
| 2013/0239739 A1* | 9/2013 | Miyahara ........... B60R 21/2037 |
| | | 74/552 |
| 2014/0131982 A1* | 5/2014 | Ishii .................. B60R 21/2037 |
| | | 280/728.2 |
| 2015/0042079 A1* | 2/2015 | Ishii ................. B60R 21/21658 |
| | | 280/728.2 |
| 2017/0036687 A1 | 2/2017 | Obayashi et al. |
| 2017/0072985 A1* | 3/2017 | Ishii .................. B60R 21/2037 |
| 2017/0144594 A1* | 5/2017 | Obayashi ................. B62D 1/04 |
| 2018/0029556 A1* | 2/2018 | Ishii .................. B60R 21/2037 |
| 2019/0047604 A1* | 2/2019 | Banno .................... B62D 7/222 |
| 2019/0092263 A1* | 3/2019 | Ishii .................... B60R 21/203 |
| 2019/0217800 A1* | 7/2019 | McMillan ................ B62D 1/11 |
| 2020/0043679 A1* | 2/2020 | Nonoyama ......... B60R 21/2037 |
| 2020/0282906 A1* | 9/2020 | Barritault ................. H01H 3/60 |
| 2020/0307493 A1* | 10/2020 | Nagata .................. B60Q 5/003 |
| 2020/0317123 A1* | 10/2020 | Osterfeld ............... B60Q 5/003 |
| 2020/0398782 A1* | 12/2020 | Mills .................. B60R 21/2035 |
| 2021/0269080 A1* | 9/2021 | Kim .................. B60R 21/2037 |
| 2021/0347299 A1* | 11/2021 | Groleau ................. H01H 13/14 |

FOREIGN PATENT DOCUMENTS

| | | |
|---|---|---|
| JP | 2017197185 A | 11/2017 |
| JP | 6447671 B2 | 1/2019 |
| WO | 2017/154571 A1 | 9/2017 |

* cited by examiner

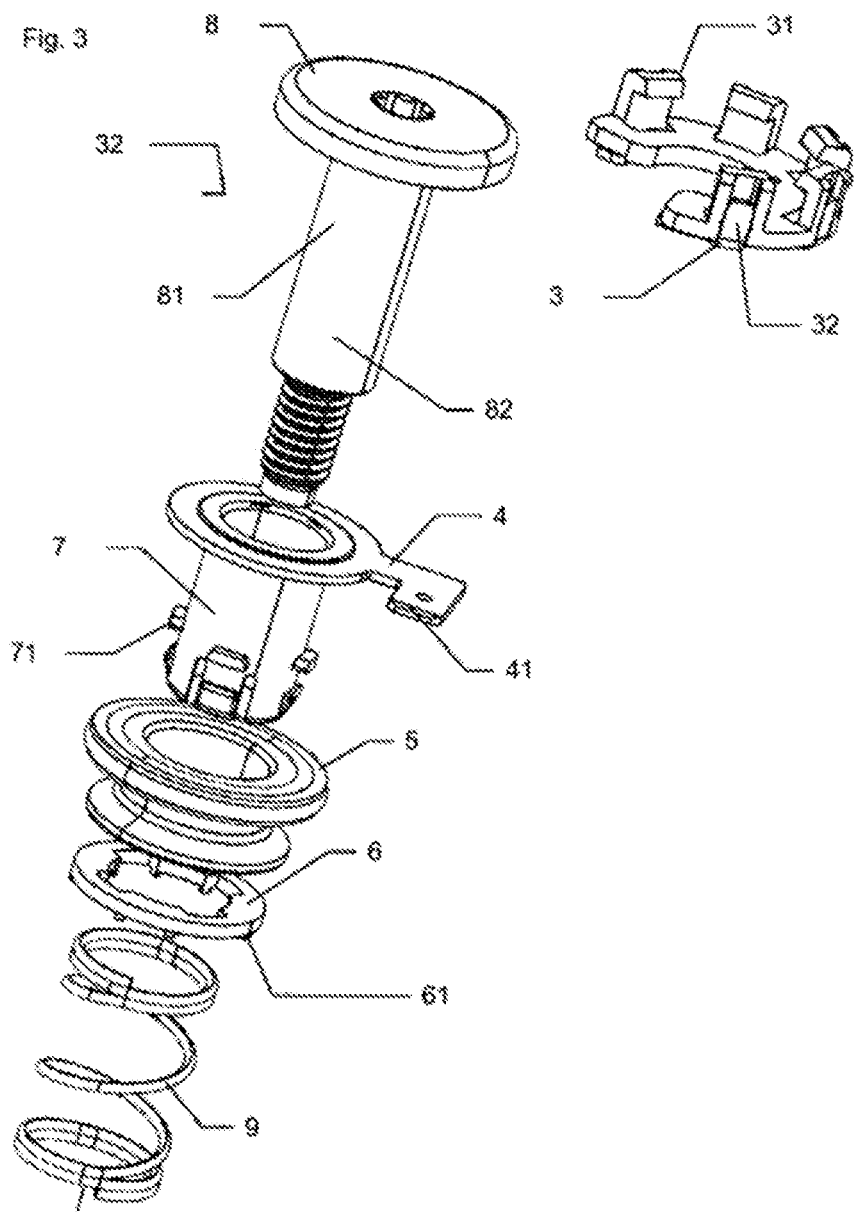

VEHICLE STEERING WHEEL COMPRISING A HORN CONTROL DEVICE, VEHICLE WITH SUCH A STEERING WHEEL, METHOD FOR ASSEMBLING SUCH A STEERING WHEEL

CROSS-REFERENCE TO RELATED APPLICATIONS

This application is a 35 U.S.C. § 371 national phase of PCT International Application No. PCT/EP2019/074170, filed Sep. 11, 2019, which claims the benefit of priority under 35 U.S.C. § 119 to French Patent Application No. 1858203, filed Sep. 13, 2018, the contents of which are incorporated herein by reference in their entirety.

FIELD

The present invention relates in general to a motor vehicle steering wheel comprising a horn control device and a vibration-damping device.

BACKGROUND

Devices combining the functions of horn and vibration damper are known from the prior art. Document WO 2017/154571 A1 describes a device wherein:

terminals of a horn are located on an airbag attachment support and on a steering wheel frame, a return spring of the horn compresses damping means.

The system therefore lacks compactness and simplicity due to the numerous parts included between the terminals of the horn and the effectiveness of the vibration damper is adversely affected by the constant compression of the return spring of the horn, which reduces the damping compactness.

SUMMARY

One aim of the present invention is to respond to the above-mentioned disadvantages of the document of the prior art and in particular, principally, to propose a steering wheel, the horn of which is compact and can effectively absorb vibrations.

To that end, a first aspect of the invention relates to a motor vehicle steering wheel, comprising a horn device, the steering wheel comprising:

a frame, an attachment support which is arranged to receive a safety module and which is movable relative to the frame between a rest position and a depressed position, means for guiding the attachment support, comprising a first guiding part integral with the frame, and a second guiding part integral with the attachment support, a horn electrical circuit part with at least one switch comprising a first contact terminal, arranged on the frame, and a second contact terminal, embedded with the attachment support, resilient return means, arranged to automatically exert a return force on the second guiding part in order to push it from the depressed position back toward the rest position, deformable damping means, separate from the resilient return means, positioned between the attachment support and the second guiding part, the second guiding part comprising a push interface for receiving the return force of the resilient means, characterized:

in that the push interface is arranged between the resilient return means and the damping means, and in that the second contact terminal is supported by the second guiding part.

The use of the second guiding part as a support for the second contact terminal makes the device more compact and makes changing the state of the switch clearer since there is no longer a lever arm between the second contact terminal and the second guiding part.

The push interface, dissociated and separate from the damping means, makes it possible to avoid having to pass the return force via the damping means. The fact that the damping means are not constantly compressed by the resilient return means exerting the return force directly on the second guiding part improves the behavior of the damping means. They thus enable better damping of vibrations of the steering wheel, using the mass of the safety module.

In the rest position, the horn is not activated and therefore is not emitting any warning signal. When the attachment support is in the depressed position, the horn is activated and therefore emits a warning signal.

According to the above implementation, the deformable damping means are separate from the resilient return means and are positioned between the attachment support and the second guiding part, and the push interface is arranged between the resilient return means and the damping means. As a result, the axial space allocated to the damping means is independent of the spring force or of the position of the attachment support.

According to the above implementation, the push interface is arranged between the resilient return means and the damping means in an axial or displacement direction of the attachment support. In other words, the stop of the spring is beneath the damping means (or damper).

According to the above implementation, the second contact terminal is supported by the second guiding part, which guarantees that vibrations present on or supplied to the support are not transmitted to the contact terminals.

Advantageously, the push interface is arranged between the guide means or resilient return means and the damping means, in a direction radial or transverse to the displacement of the attachment support. As a result, an inner diameter of the damping means is greater than an outer diameter of the guiding means or resilient return means or of the stop (the push interface).

Advantageously, the second guiding part and/or a push interface comprises an interface for holding the resilient return means, for instance a fir-tree-base-shaped interface, such as a groove with an edge, arranged to be coupled to a helical spring.

Advantageously, the guide means are one or more guide elements.

Advantageously, the resilient return means are one or more resilient return means.

Advantageously, the damping means are one or more damping means.

Advantageously, the damping means are arranged between the second contact terminal and the resilient return means.

This embodiment is further simplified and more compact, because it makes it possible to use the second contact terminal as a support for the damping means.

Advantageously, the guide means are arranged to guide the attachment support in translation in a direction of activation of the horn.

Advantageously, the push interface is in direct contact with the resilient return means. This embodiment simplifies the interface while avoiding any intermediate parts.

Advantageously, the horn switch is in a closed state in the rest position.

In other words, the electrical circuit is closed in the rest position. As the attachment support is depressed, the electrical circuit opens. This change of state can be detected by a computation unit arranged to trigger the sending of a warning signal when the circuit is opened. This type of horn activation is highly responsive since the path to activation is much shorter then when it is necessary to close a circuit. Since the activation distance is shorter, this makes is possible to define smaller clearances between the movable components and in particular between the safety module and surrounding fixed parts. The stiffness of the resilient return means can be chosen to be greater (reducing the risk of inopportune triggering) without increasing the force required to activate the horn.

Advantageously, the first guiding part is a screw comprising a stop or a shoulder defining the rest position.

Advantageously, the second guiding part is a sliding sleeve arranged to slide over the screw.

Advantageously:

the damping means are arranged in a groove and between a first bearing surface and a second bearing surface of the second guiding part, the first bearing surface being larger than the second bearing surface, the second bearing surface being small enough to enable the damping means to be inserted in the groove, the vehicle steering wheel further comprising a spacer arranged between the damping means and the second bearing surface.

In other words, the second bearing surface is small enough to enable the insertion of the damping means but not large enough to ensure holding thereof when the whole device is assembled. In order to ensure satisfactory holding in position, a spacer is added so as to offer a larger bearing surface. It is also understood that a width of the groove is fixed and predetermined and not influenced or modified by the resilient return means. Thus, the damping means are free of stresses exerted directly by the resilient return means.

Advantageously, the spacer has a contact surface shared with the damping means which is greater than the second bearing surface.

Advantageously, the spacer is arranged to be assembled on the second guiding part by clipping or via a bayonet interface. Clipping is understood to mean assembling one part on another; at least one of the parts being elastically deformed during the assembly before returning to a less constrained state wherein it is connected to the other of the two parts. This is therefore assembly by elastic deformation and return. Such an assembly can also be termed elastic interlocking.

This embodiment enables simple and effective assembly of the spacer.

Advantageously, the first bearing surface is formed by the second contact terminal.

Advantageously, the second contact terminal is overmolded on the second guiding part.

Advantageously, the first contact terminal is arranged to be clipped on the screw in a direction perpendicular to the direction of activation of the horn.

This embodiment is advantageous because it makes it possible to make the orientation of the first contact terminal relative to the screwing axis of the screw independent of the orientation of the screw. The first contact terminal can be placed on the screw after the latter has been screwed.

Advantageously, the first contact terminal is integral with an electrically insulating clipping interface, the clipping interface comprising a clip arranged to clip the second contact terminal onto the screw.

This embodiment makes it possible to propose a horn electrical circuit which is insulated from the frame in a simple manner. Typically, the clipping interface comprises two flexible lateral fingers or tabs with a central recess, to be coupled to the shaft of the screw.

Advantageously, the guide means are composed of two screws, the electrical circuit part comprising two switches, the steering wheel further comprising a terminal support integral with the two screws, the terminal support supporting the two first terminals of each switch.

This simplifies the assembly operations since several terminals are assembled on the screw in a single operation.

Advantageously, the terminal support is clipped onto the screws.

A second aspect of the invention relates to a motor vehicle comprising a vehicle steering wheel according to the first aspect of the invention.

A third aspect of the invention relates to a method for manufacturing a steering wheel according to the first aspect of the invention, comprising the steps of:

compressing the resilient return means so as to position the attachment support in the depressed position, screwing the screw, clipping the first contact terminal onto the screw so as to the first contact terminal in a predetermined direction, releasing the resilient return means so as to close the switch.

This method is advantageous for the assembly of a normally-closed horn device, since, by using a screw as a stop for the horn, it makes it possible to do away with the effect of the rotation of the screw on the final orientation of the first contact terminal relative to the frame. Indeed, in order to guarantee subsequent wiring of the horn device, it is preferable for the first contact terminal to always be oriented in the same way relative to the steering wheel frame in order to prevent any risk of interference with surrounding parts. The proposed method has this advantage since the contact terminal is only placed on the screw after the latter has been screwed. The contact terminal can thus be readily positioned in a predetermined orientation. Since the contact terminal is clipped, the method is simple and quick.

Advantageously, the method comprises the step of assembling the attachment support with the damping means, the second guiding part, the second terminal and the resilient return means.

BRIEF DESCRIPTION OF THE DRAWINGS

Other features and benefits of the present invention will be seen more clearly from reading the following detailed description of several embodiments of the invention, provided by way of a non-limiting example and illustrated by the appended drawings, wherein:

FIG. 3 depicts an exploded three-dimensional view of the horn control device.

DETAILED DESCRIPTION

Figure 1:
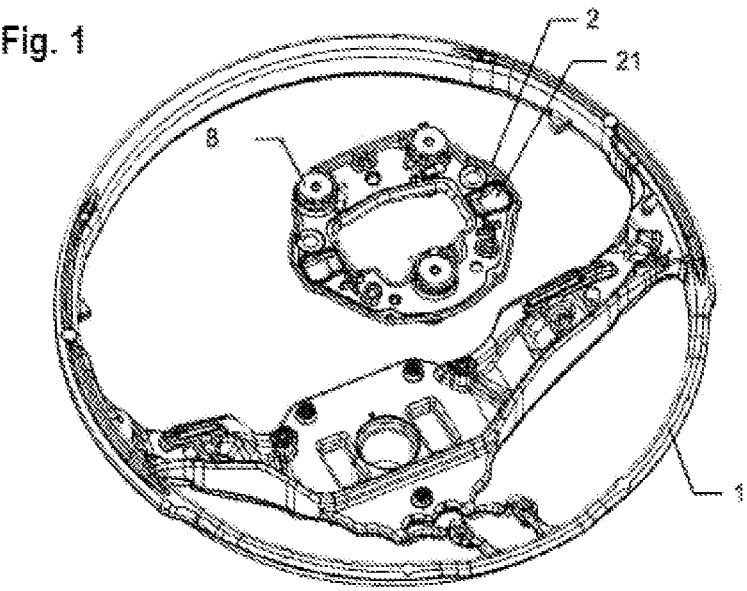
FIG. 1 depicts an exploded three-dimensional view of a first embodiment of a steering wheel fitted with a horn control device.

FIG. 1 depicts a steering wheel frame 1 on which an attachment support 2 is attached via three screws 8, already engaged in the attachment support 2. The attachment support 2 is arranged to receive a safety module, otherwise referred to as airbag, not shown, in two openings 21. The two openings 21 receive two retaining hooks for the airbag which is then retained on the attachment support 2 via an elastic snap ring 22 which can be seen in FIG. 2.

Figure 2:
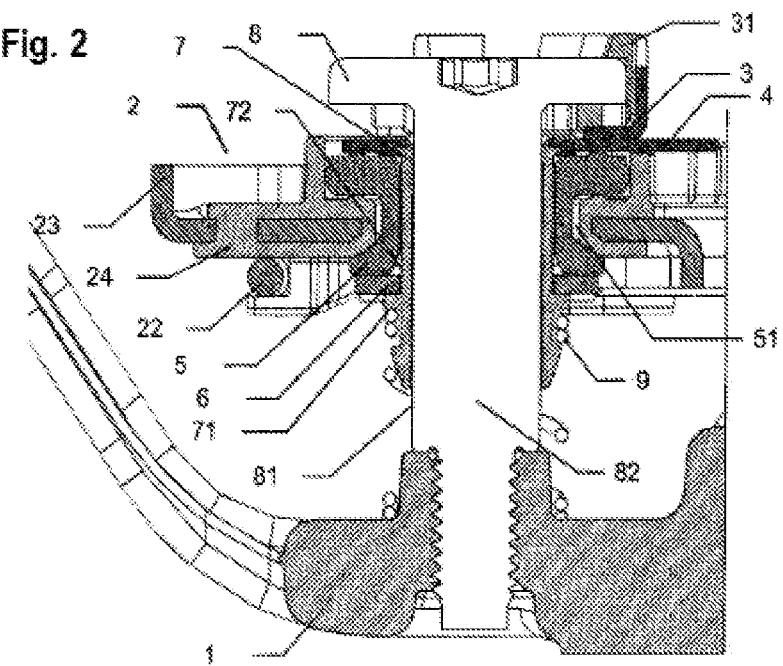
FIG. 2 depicts a detailed sectional view of the steering wheel from FIG. 1 with the horn control device in the rest position.

FIG. 2 depicts a partial sectional view along a plane passing through a screwing axis 82 of one of the screws. The attachment support 2 is in the rest position in this figure. In other words, the horn is not activated.

The flanged-head screw 8 is mounted on the frame 1, forming a stop for the horn device. The first contact terminal 3 is clipped onto the flanged head via an insulating clipping interface 31. The first contact terminal 3 is manufactured in an electrically conductive material. The insulating clipping interface 31 makes it possible to electrically insulate the first contact terminal 3 from the screw 8 and therefore from the steering wheel frame. Placing the first contact terminal 3 by clipping, and in particular by clipping in a direction 32 detailed in FIG. 3 perpendicular to the screwing axis 82 of the screw 8, is advantageous because it can be carried out after the screw 8 has been completely screwed. Thus, the final orientation of the first contact terminal 3 is not dependent on the final orientation of the screw 8.

In the embodiment shown, the screw 8 comprises a smooth guide surface 81. The screw 8 is therefore the first guiding part of the guide means of the device. The smooth surface 81 guides a second guiding part 7 in translation along the screwing axis 82. The second guiding part 7 is in the form of an electrically insulating plastic part.

The second guiding part 7 comprises a push interface 71 in the form of notches, which can be more clearly seen in FIG. 3, on which a first end of a spring 9 used as resilient return means comes to bear. With the second end of the spring 9 bearing on the frame 1, the notches 71 make it possible to push the second guiding part 7 back into the rest position; in the embodiment described, in abutment on the flanged-head screw 8.

The length of the second guiding part 7 comprises, following the notches 71, a groove 72 in which the damping means 5, and a spacer 6 making it possible to correctly hold the damping means 5 in the groove 72, are positioned. The damping means 5 have the shape of an annular ring, formed for example of EPDM. The groove 72 is formed on one side by the second contact terminal 4, which forms a first bearing surface and which is overmolded here on the second guiding part, and the notches 71 which form a second bearing surface. The second contact terminal 4 is manufactured in an electrically conductive material and comprises a contact strip 41, which can be seen in FIG. 3, for connection to the electrical circuit of the horn.

The surface of the second contact terminal 4 is large enough to provide a satisfactory bearing surface for the damping means 5. The notches 71 have a satisfactory bearing surface for the spring 9 but which is smaller than the bearing surface offered by the second contact terminal 4. This smaller bearing surface enables the insertion of the damping means 5 but is not however sufficient to ensure the correct holding of the damping means 5 when the steering wheel is assembled. A complementary bearing surface is therefore provided by the spacer 6 which is assembled on the second guiding part 7 after the insertion of the damping means 5. This subsequent assembly of the spacer 6 is made possible by notches positioned on the inside of the spacer 6, which can be seen more clearly in FIG. 3. These notches are complementary to those present on the second guiding part and form therewith a bayonet interface which enables the assembly of the spacer 6 by a movement of translation then rotation relative to the screwing axis 82. In order to prevent any expulsion of the spacer 6 once it has been assembled, the spacer 6 also comprises lugs 61, which can be seen in FIG. 3 and which block the rotation of the spacer 6 by bearing on the notches of the push interface 71. Alternatively, the spacer 6 can be clipped onto the screw by a movement along the screwing axis 82 or along an axis perpendicular thereto.

The damping means 5 are clipped onto the attachment support 2. A radial clearance 51 is provided between the attachment support 2 and the damping means 5 to enable the latter to be deformed during their insertion on the second guiding part 7 and in particular during the passage of the push interface 71. The attachment support 2 is formed of a metal core 23 on which various interface elements 24 are overmolded in plastic. The airbag module, not shown, is retained on the attachment support 2 by the elastic snap ring 22.

When an activation force is applied in an activation direction, i.e. when a force toward the frame 1 is applied to the airbag module along an axis parallel to the screwing axis 82 of the screw 8, itself substantially parallel to an axis of rotation of the steering wheel making it possible to alter the orientation of wheels of the vehicle, this leads to a displacement of the attachment support 2 which, due to contacts between, the attachment support 2 and the damping means 5,
the damping means 5 and the spacer 6, and
the spacer 6 and the push interface 71, causes the displacement of the second guiding part 7, the opening of the contact between the first and second terminals 3, 4, and thus the activation of the horn device.

When the force on the airbag module is released, the spring 9 pushes the assembly of the device back toward the top of the figure, causing the closing of the contact between the first and second terminals 3, 4 and thus the deactivation of the horn device. Since the return force is applied by the spring 9 on the second guiding part 7 via the push interface 71 and not via the damping means 5, the damping characteristics of the damping means 5 are optimized. This is because, in order to be effective, the damping means 5 have to be just constrained. This is achieved by the spacer 6 which, with the second contact terminal 4, defines a space of a fixed and predetermined width; this space is not modified by the return force generated by the spring 9. In other words, in the rest position, the return force of the spring 9 does not pass, either constantly or temporarily, via the damping means.

FIG. 3 depicts an exploded three-dimensional view of the horn control device. The attachment support 2 is not shown in this view. This figure shows the insulating clipping interface 31 in more detail. This part, in horseshoe or closed U shape, has a slightly smaller opening than a diameter of the screw 8 on which it is clipped in a direction 32 substantially perpendicular to the screwing axis 82 of the screw 8. The first contact terminal 3 is held on the insulating clipping interface 31 by a plurality of claws 32.

The assembly of the steering wheel comprises the following steps:

positioning a sub-assembly comprising the attachment support 2, the damping means 5, the second guiding part 4, the spacer 6 and the resilient return means or spring 9 on the frame 1, compressing the resilient return means or spring 9 so as to position the attachment support 2 in the depressed position, screwing the screw 8, clipping the first contact terminal 3 onto the screw 8 so as to orient the first contact terminal 3 in a predetermined direction, and releasing the resilient return means or spring 9.

It will be understood that various modifications and/or improvements obvious to those skilled in the art can be made to the different embodiments of the invention described in the present description, without going beyond the scope of the invention as defined by the appended claims. In particular, the device could be adapted:

to a normally-open horn device, whereas the preceding detailed description concentrated on a system with a normally-closed switch and to an uninsulated horn device, i.e. one in which the electrical circuit of the horn comprises the conductive frame 1 of the steering wheel, whereas the preceding detailed description concentrated on an insulated system due to the presence of the insulating clipping interface 31 and due to the insulating second guiding part 7 made of plastic.

The invention claimed is:

1. A motor vehicle steering wheel comprising a horn device, the steering wheel comprising:
    a frame,
    an attachment support which is arranged to receive a safety module and which is movable relative to the frame between a rest position and a depressed position,
    a first guiding part integral with the frame, and a second guiding part integral with the attachment support, the first and second guiding parts guide movement of the attachment support,
    a horn electrical circuit with at least one switch comprising a first contact terminal separately coupled on the first guiding part, and a second contact terminal arranged with the attachment support,
    a resilient return element, arranged to automatically exert a return force on the second guiding part in order to push the attachment support from the depressed position back toward the rest position,
    a deformable damping element, separate from the resilient return element, positioned between the attachment support and the second guiding part,
    the second guiding part comprising a push interface for receiving the return force of the resilient return element,
    wherein the push interface is arranged between the resilient return element and the damping element, and
    wherein the second contact terminal is disposed directly on the second guiding part.

2. The motor vehicle steering wheel according to claim 1, wherein the damping element is arranged between the second contact terminal and the resilient return element.

3. The motor vehicle steering wheel according to claim 1, wherein the horn electrical circuit is in a closed state in the rest position.

4. The motor vehicle steering wheel according to claim 1, wherein the first guiding part is a screw comprising a stop or a shoulder defining the rest position.

5. The vehicle steering wheel according to claim 4, wherein the second guiding part is a sliding sleeve arranged to slide over the screw.

6. The vehicle steering wheel according to claim 4, wherein the first contact terminal is arranged to be clipped on the screw in a direction perpendicular to the direction of activation of the horn device.

7. The vehicle steering wheel according to claim 6, wherein the first contact terminal is integral with an electrically insulating clipping interface, the clipping interface comprising a clip arranged to clip the first contact terminal onto the screw.

8. A method for assembling a steering wheel according to claim 4, comprising the steps of:
    compressing the resilient return element so as to position the attachment support in the depressed position,
    screwing the screw,
    clipping the first contact terminal onto the screw so as to orient the first contact terminal in a predetermined direction,
    releasing the resilient return element so as to close the switch.

9. The vehicle steering wheel according to claim 1, wherein:
    the damping element is arranged in a groove and between a first bearing surface and a second bearing surface of the second guiding part,
    the first bearing surface being larger than the second bearing surface,
    the second bearing surface being small enough to enable the damping element to be inserted in the groove,
    the vehicle steering wheel further comprising a spacer arranged between the damping element and the second bearing surface.

10. The steering wheel according to claim 9, wherein the spacer has a contact surface shared with the damping element offset in the direction toward the rest position relative to the second bearing surface.

11. The steering wheel according to claim 9, wherein the spacer is arranged to be assembled on the second guiding part by clipping or via a bayonet interface.

12. The vehicle steering wheel according to one of claim 9, wherein the first bearing surface is formed by the second contact terminal.

13. The vehicle steering wheel according to claim 1, wherein the first guide element is a screw,
    wherein the steering wheel further comprises a second screw,
    wherein the horn electrical circuit includes a second switch, the second switch including a third contact terminal separately coupled on the second screw.

14. The vehicle steering wheel according to claim 13, wherein the first and third contact terminals are each clipped onto the screw and second screw respectively.

15. The vehicle steering wheel according to claim 1 in combination with a motor vehicle.

16. A motor vehicle steering wheel comprising a horn device, the steering wheel comprising:
    a frame,
    an attachment support which is arranged to receive a safety module and which is movable relative to the frame between a rest position and a depressed position,
    a first guiding part integral with the frame, and a second guiding part integral with the attachment support, the first and second guiding parts guide movement of the attachment support,
    a horn electrical circuit with at least one switch comprising a first contact terminal arranged with the frame, and a second contact terminal arranged with the attachment support, a resilient return element, arranged to automatically exert a return force on the second guiding part in order to push the attachment support from the depressed position back toward the rest position,
a deformable damping element, separate from the resilient return element, positioned between the attachment support and the second guiding part,
the second guiding part comprising a push interface for receiving the return force of the resilient return element,
wherein the push interface is arranged between the resilient return element and the damping element,
wherein the second contact terminal is supported by the second guiding part, and
wherein the horn electrical circuit is in a closed state in the rest position.

\* \* \* \* \*